(12) United States Patent
Lee et al.

(10) Patent No.: US 11,641,624 B2
(45) Date of Patent: May 2, 2023

(54) WAKE-UP RADIO SYSTEMS AND METHODS BASED ON BACKSCATTER WAKE-UP RADIO

(71) Applicant: RESEARCH & BUSINESS FOUNDATION SUNGKYUNKWAN UNIVERSITY, Suwon-si (KR)

(72) Inventors: Tae-Jin Lee, Suwon-si (KR); Eun-Jin Choi, Suwon-si (KR); Yunmin Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 130 days.

(21) Appl. No.: 16/915,158

(22) Filed: Jun. 29, 2020

(65) Prior Publication Data
US 2021/0204213 A1 Jul. 1, 2021

(30) Foreign Application Priority Data
Dec. 30, 2019 (KR) ........................ 10-2019-0177969

(51) Int. Cl.
*H04W 52/02* (2009.01)
*H04W 40/24* (2009.01)
*H04W 74/08* (2009.01)

(52) U.S. Cl.
CPC ..... *H04W 52/0229* (2013.01); *H04W 40/244* (2013.01); *H04W 52/0216* (2013.01); *H04W 74/0808* (2013.01)

(58) Field of Classification Search
None
See application file for complete search history.

(56) References Cited

U.S. PATENT DOCUMENTS

2004/0198233 A1* 10/2004 Pratt .................... G06K 7/0008
455/67.11
2005/0024187 A1* 2/2005 Kranz ................ G06K 19/0712
340/10.33

(Continued)

FOREIGN PATENT DOCUMENTS

KR 10-1185624 B1 9/2012
KR 2015-0070636 * 12/2013

(Continued)

OTHER PUBLICATIONS

Korean Office Action dated May 13, 2021 in counterpart Korean Patent Application No. 10-2019-0177969 (2 pages in Korean).

(Continued)

*Primary Examiner* — Andre Tacdiran
(74) *Attorney, Agent, or Firm* — NSIP Law (57) ABSTRACT

Provided are wake-up radio systems and methods based on backscatter wake-up radio. The wake-up radio method based on backscatter wake-up radio includes setting an arbitrary receiving window period in a window setting period by receiving a beacon signal from a data collection apparatus, transmitting a backscatter response message to the data collection apparatus based on a reception time of a contention signal received from the data collection apparatus in the set receiving window period, in the window setting period, and receiving a wake-up signal from the data collection apparatus in the data transmission period to set as a wake-up period and transmitting data to the data collection apparatus based on a scheduling time according to a backscatter response message.

12 Claims, 9 Drawing Sheets

(56) References Cited

U.S. PATENT DOCUMENTS

| | | | |
|---|---|---|---|
| 2009/0274082 A1 | 11/2009 | Wentink | |
| 2015/0091700 A1 | 4/2015 | Ovard et al. | |
| 2018/0331966 A1* | 11/2018 | Lee | H04L 67/04 |
| 2019/0028967 A1* | 1/2019 | Ahn | H04W 52/0216 |

FOREIGN PATENT DOCUMENTS

| | | | |
|---|---|---|---|
| KR | 10-2029833 B1 | | 10/2019 |
| TW | 201739293 A | * | 11/2017 |
| WO | WO2019178824 | * | 3/2018 |

OTHER PUBLICATIONS

Nilsson, Björn, et al. "An Active Backscatter Wake-up and Tag Identification Extraction Protocol for Low Cost and Low Power Active RFID", *2010 IEEE International Conference on RFID-Technology and Applications. IEEE*, Guangzhou, China, Jun. 17-19, 2010 (pp. 86-91).

Lyu, Bin, et al. "Optimal Time Allocation in Backscatter Assisted Wireless Powered Communication Networks." *Sensors*, 17, 6, Jun. 1, 2017 (pp. 1-11).

Anh, Tran The, et al. "Deep Reinforcement Learning for Time Scheduling in RF-Powered Backscatter Cognitive Radio Networks", *2019 IEEE Wireless Communications and Networking Conference (WCNC). IEEE*, Oct. 3, 2018 (pp. 1-7).

Choi et al., "Low Power Contention and High-efficient Data Transmission for Backscatter Wake-up Radio," KICC Summer Conference 2019, Jun. 20, 2019, pp. 0421-0422.

* cited by examiner

| Parameter | Value |
| --- | --- |
| WINDOW SETTING PERIOD | 10 s |
| RECEIVING WINDOW LENGTH | 0.5, 1 s |
| CONTENTION SIGNAL TRANSMISSION INTERVAL (1/$\lambda$) | 0.5, 2 s |
| NUMBER OF TERMINALS IN NETWORK | 10 ~ 300 |
| DATA SIZE | 800 bit |
| CHANNEL BIT TRANSMISSION RATE | 1 Mbit/s |

WAKE-UP RADIO SYSTEMS AND METHODS BASED ON BACKSCATTER WAKE-UP RADIO

CROSS-REFERENCE TO RELATED APPLICATIONS

This application claims priority to Korean Patent Application No. 10-2019-0177969 filed on 30 Dec. 2019 in Korea, the entire contents of which are hereby incorporated by reference in their entirety.

BACKGROUND OF THE DISCLOSURE

1. Technical Field

The present disclosure relates to wake-up radio systems and methods based on backscatter wake-up radio.

2. Description of Related Art

Backscatter communication can transmit data without power by reflecting an external signal, and transmit data without using energy of a terminal, so the backscatter communication has the advantage of improving energy efficiency.

On the other hand, as a mobile device including a built-in battery as a power source spreads and the usage time of the mobile device becomes important, energy efficiency of a wireless communication terminal is also becoming important. Therefore, there is a need for a wireless communication method that can further increase the energy efficiency of the wireless communication terminal. A method mainly used to increase energy efficiency in a wireless LAN is that the wireless communication terminal enters a sleep mode when the wireless communication terminal is not used. However, since the wireless communication terminal entering the sleep mode does not perform wireless communication, wireless communication between the wireless communication terminal and an external device may be limited. In addition, the wireless communication terminal may need to periodically stop the sleep mode in order to receive the wireless signal that the external device transmits to the wireless communication terminal. Therefore, a method has been proposed in which a wireless communication terminal uses a separate wake-up radio that triggers an interruption of the sleep mode. When the wireless communication terminal uses a wake-up radio, the wireless communication terminal includes a wake-up radio receiver for receiving a wake-up radio with low-power, and in sleep mode, the wireless communication terminal may receive the wake-up radio through the wake-up radio receiver.

Figure 1:
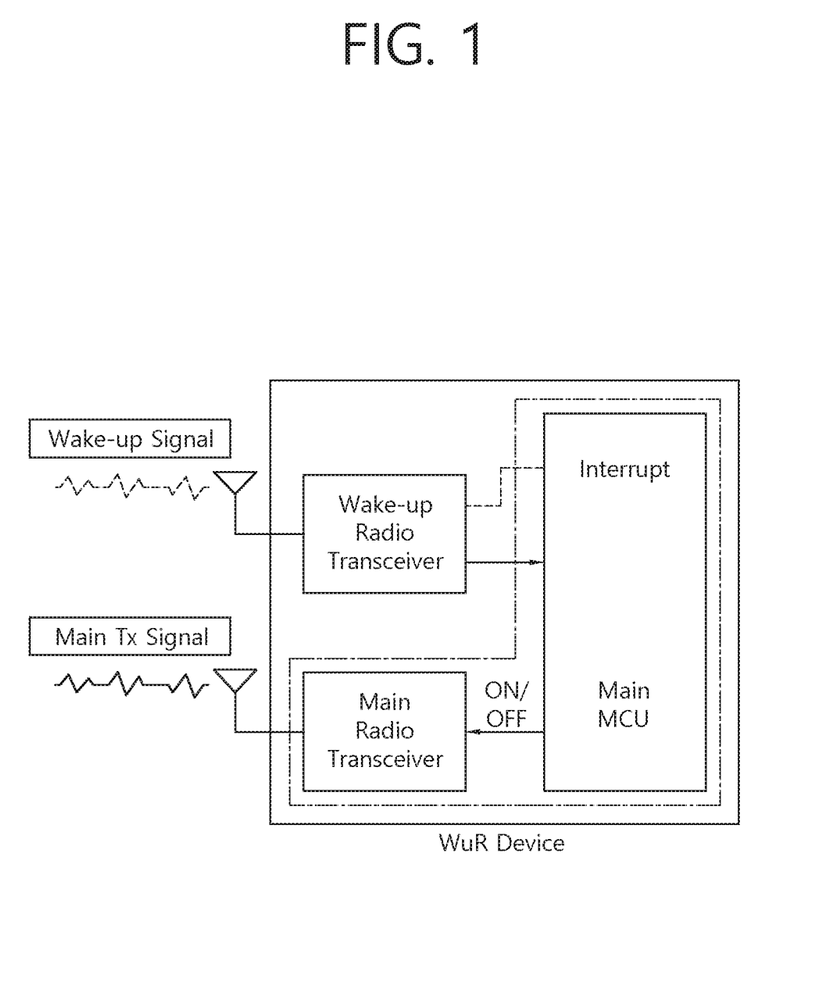
FIG. 1 is a view illustrating a configuration of the conventional wake-up radio terminal.

FIG. 1 is a view illustrating a configuration of the conventional wake-up radio terminal.

As illustrated in FIG. 1, the conventional wake-up radio (WuR) technology monitors a channel through a secondary transmitter referred to as a wake-up radio transmitter in which a wake-up radio terminal (WuR device) may perform a low-power operation in a sleep mode. A main micro controller unit (main MCU) of the wake-up radio terminal releases the sleep mode through an interrupt operation when a specific wake-up signal is received, and turns on a primary transmitter of a main operation unit referred to as a main radio transmitter to transmit data.

The wake-up radio technology can use a secondary transmitter that performs a low-power operation 1/1000 times lower than the main operation unit, thereby reducing the energy consumption of the terminal. However, the wake-up radio terminals may still cause the energy consumption due to collision during transmission of data through the primary transmitter. In addition, if the number of wake-up radio terminals increases, collision due to channel contention with neighboring wake-up radio terminals may increase.

SUMMARY

Some embodiments of the present disclosure provide wake-up radio systems and methods based on backscatter wake-up radio that can perform a low-power channel contention using minimal energy in a network environment including a backscatter wake-up radio terminal and perform a high-efficiency data transmission according to a wake-up signal.

Some embodiments of the present disclosure provide wake-up radio systems and methods based on backscatter wake-up radio that can improve energy efficiency and network throughput by performing a low-power channel contention in a network environment including a wake-up radio terminal and performing data transmission based on set scheduling order through the channel contention.

However, the problem to be solved of the present disclosure is not limited thereto, and may be variously expanded in the environment that does not deviate from the spirit and scope of the present disclosure.

In an aspect, a method for operating a wake-up radio terminal based on a backscatter wake-up radio includes: setting an arbitrary receiving window period in a window setting period by receiving a beacon signal from a data collection apparatus; transmitting a backscatter response message to the data collection apparatus based on a reception time of a contention signal received from the data collection apparatus in the set receiving window period, in the window setting period; and receiving a wake-up signal from the data collection apparatus in the data transmission period to set as a wake-up period and transmitting data to the data collection apparatus based on a scheduling time according to a backscatter response message.

In the setting of the receiving window period, a beacon signal including a window setting period and a receiving window length may be received from the data collection apparatus, and an arbitrary receiving window period having the receiving window length may be set in the window setting period included in the beacon signal.

In the transmitting of the backscatter response message, when a contention signal is received from the data collection apparatus in the set receiving window period, a back-off value may be determined based on the reception time of the received contention signal to transmit the backscatter response message to the data collection apparatus.

In the transmitting of the backscatter response message, the reception time of the contention signal may be measured through a clock operation in the receiving window period divided by the same interval or an arbitrary interval, and the back-off value corresponding to the measured period may be determined to transmit the backscatter response message to the data collection apparatus.

The method may further include: operating in a sleep mode in remaining window setting periods other than the set receiving window period in the window setting period.

The method of claim 1 may further include: operating in a sleep mode in remaining data transmission periods other than the set wake-up period in the data transmission period.

In the transmitting of the data, data may be transmitted to the data collection apparatus based on terminal information and a scheduling order included in the received wake-up signal.

In another aspect, a method for operating a wake-up radio terminal based on a backscatter wake-up radio includes: transmitting a beacon signal including a window setting period and a receiving window length to the wake-up radio terminal; transmitting a contention signal to the wake-up radio terminal in the window setting period, and scheduling data transmission based on a backscatter response message received from the wake-up radio terminal; and transmitting a wake-up signal to the wake-up radio terminal according to the scheduled data transmission result in a data transmission period.

In the scheduling of the data transmission, a contention signal may be transmitted to the wake-up radio terminal at an arbitrary time interval in the window setting period.

In the scheduling of the data transmission, a wake-up terminal may be determined to transmit data in the data transmission period based on a result of a contention of the backscatter response message transmitted based on a transmission time of the contention signal.

In the transmitting of the wake-up signal, terminal information and a scheduling order of the wake-up radio terminal determined according to the scheduled data transmission result are included in the wake-up signal and transmitted.

In another aspect, a wake-up radio terminal based on a backscatter wake-up radio includes: a communication module that includes a wake-up radio transmitter performing backscatter communication in a sleep mode and a main radio transmitter performing data transmission in a wake-up mode; a memory that stores one or more programs; and a processor that executes the stored one or more programs, in which the processor sets an arbitrary receiving window period in a window setting period by receiving a beacon signal from a data collection apparatus through the communication module, transmits a backscatter response message to the data collection apparatus based on a reception time of a contention signal received from the data collection apparatus in the set receiving window period, in the window setting period, and receives a wake-up signal from the data collection apparatus to set as a wake-up period in the data transmission period and transmits data to the data collection apparatus based on a scheduling time according to the backscatter response message.

The processor may receive a beacon signal including a window setting period and a receiving window length from the data collection apparatus, and set an arbitrary receiving window period having the receiving window length in the window setting period included in the beacon signal.

The processor may determine a back-off value based on the reception time of the received contention signal to transmit the backscatter response message to the data collection apparatus when a contention signal is received from the data collection apparatus in the set receiving window period.

The processor may measure the reception time of the contention signal through a clock operation in the receiving window period divided by the same interval or an arbitrary interval, and determine the back-off value corresponding to the measured period to transmit the backscatter response message to the data collection apparatus.

The processor may operate in a sleep mode in the remaining window setting periods other than the set receiving window period in the window setting period.

The processor may operate in the sleep mode in the remaining data transmission periods other than the set wake-up period in the data transmission period.

The processor may transmit data to the data collection apparatus based on terminal information and a scheduling order included in the received wake-up signal.

In another aspect, a wake-up radio terminal based on a backscatter wake-up radio includes: a communication module that communicates with the wake-up radio terminal based on backscatter wake-up radio and collects data from the wake-up radio terminal; a memory that stores one or more programs; and a processor that executes the stored one or more programs, in which the processor transmits a beacon signal including a window setting period and a receiving window length to the wake-up radio terminal through the communication module, transmits a contention signal to the wake-up radio terminal in the window setting period, and schedule data transmission based on a backscatter response message received from the wake-up radio terminal, and transmits a wake-up signal to the wake-up radio terminal according to the scheduled data transmission result in a data transmission period.

The processor may transmit a contention signal to the wake-up radio terminal at an arbitrary time interval in the window setting period.

The processor may determine a wake-up terminal to transmit data in the data transmission period based on a result of a contention of the backscatter response message transmitted based on a transmission time of the contention signal.

The processor may transmit terminal information and a scheduling order of the wake-up radio terminal determined according to the scheduled data transmission result by including the terminal information and the scheduling order in the wake-up signal.

The disclosed technology can have the following effects. However, since a specific embodiment is not construed as including all of the following effects or only the following effects, it should not be understood that the scope of the disclosed technology is limited to the specific embodiment.

Exemplary embodiments of the present disclosure can perform the low-power channel contention using minimal energy in the network environment including the backscatter wake-up radio terminal, and perform the high-efficiency data transmission according to the wake-up signal.

Exemplary embodiments of the present disclosure can improve the energy efficiency and the network throughput by performing the low-power channel contention in the network environment including the wake-up radio terminal and performing the data transmission based on the set scheduling order through the channel contention.

DESCRIPTION OF EXEMPLARY EMBODIMENTS

Since the present disclosure may be variously modified and have several exemplary embodiments, specific exemplary embodiments will be illustrated in the accompanying drawings and be described in detail in a detailed description. However, this is not intended to limit the present disclosure to specific embodiments, and can be understood to include all conversions, equivalents, or substitutes included in the technical spirit and technical scope of the present disclosure. When it is decided that the detailed description of the known art related to the present disclosure may obscure the gist of the present disclosure, the detailed description thereof will be omitted.

Terms 'first', 'second', and the like, may be used to describe various components, but the components are not to be construed as being limited by these terms. The terms are used only to distinguish one component from another component.

The terms used in the present disclosure are only used to describe specific embodiments, and are not intended to limit the present disclosure. General terms that are currently widely used were selected as terms used in embodiments of the present disclosure in consideration of functions in the present disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the present disclosure. Therefore, the terms used in exemplary embodiments of the present disclosure should be defined on the basis of the meaning of the terms and the contents throughout the present disclosure rather than simple names of the terms.

Singular forms are intended to include plural forms unless the context clearly indicates otherwise. It will be further understood that the terms "comprises" or "have" used in this specification, specify the presence of stated features, steps, operations, components, parts mentioned in this specification, or a combination thereof, but do not preclude the presence or addition of one or more other features, numerals, steps, operations, components, parts, or a combination thereof.

Hereinafter, embodiments of the present disclosure will be described in detail with reference to the accompanying drawings. Like reference numerals designate like elements throughout the specification, and overlapping descriptions of the elements will not be provided.

Figure 2:
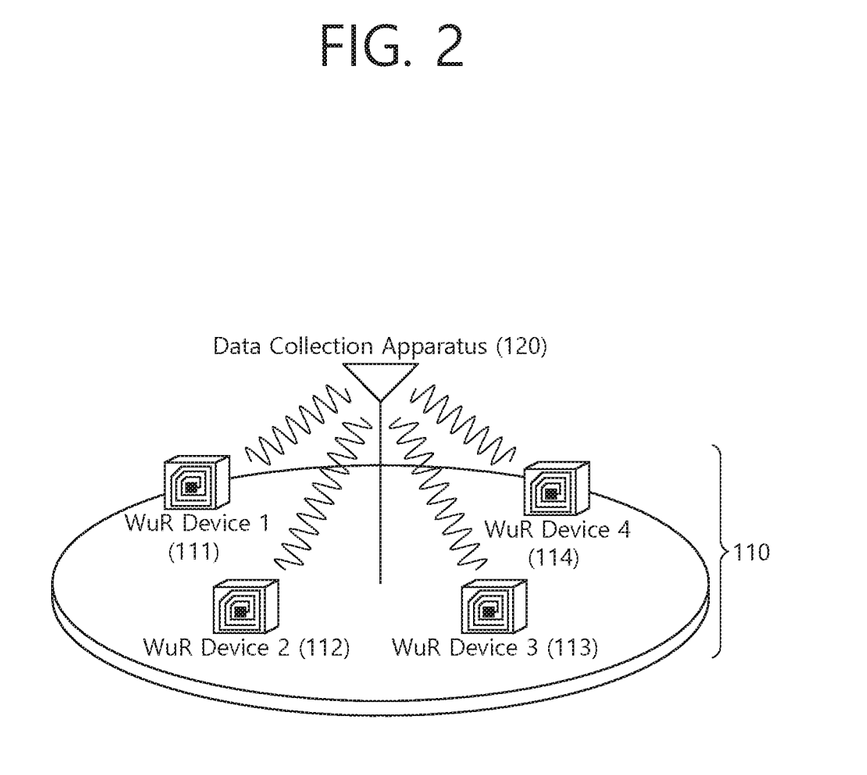
FIG. 2 is a diagram illustrating a network environment including a data collection apparatus and a plurality of backscatter wake-up radio terminals according to an embodiment of the present disclosure.

FIG. 2 is a diagram illustrating a network environment including a data collection apparatus and a plurality of backscatter wake-up radio terminals according to an embodiment of the present disclosure.

A illustrated in FIG. 2, a network environment to which an embodiment of the present disclosure is applied includes one data collection apparatus 120 and a plurality of backscatter wake-up radio terminals 110. For example, it is assumed that the plurality of backscatter wake-up radio terminals 110 are four WuR terminals 1 to 4 111 to 114. Each backscatter wake-up radio terminal 110 transmits data to the data collection apparatus 120. For low-power channel contention for data collection of the plurality of wake-up radio terminals 110 constituting a network, the data collection apparatus 120 is operated by being divided into a window setting period (WSP) in which channel contention is performed and a data transmission period in which data transmission is performed. The data collection apparatus 120 transmits a beacon signal including the window setting period and a receiving window (RW) length to all terminals in the network within the window setting period.

The wake-up radio terminals 110 receiving the beacon signal set an arbitrary reception window period within the window setting period. In the reception window period, the wake-up radio terminal 110 performs a clock operation to measure a reception time. The wake-up radio terminal 110 may measure the reception time for a signal received in the set reception window period.

Meanwhile, the data collection apparatus 120 transmits a contention signal to the wake-up radio terminals 110 at arbitrary time intervals in the window setting period. The contention signal is a signal for inducing the backscatter contention of the wake-up radio terminals 110, and the wake-up radio terminals 110 receiving the contention signal needs to transmit a backscatter response message through the backscatter. Specifically, the wake-up radio terminal 110 divides the set receiving window period into equal or random intervals according to a preset value. The wake-up radio terminal 110 transmits a backscatter response message to the data collection apparatus 120 as a backscatter by setting a back-off value corresponding to the receiving window period divided according to the contention signal reception time. Here, the back-off value represents a backscatter back-off value. As a result, the wake-up radio terminal 110 may perform low-power channel contention. When a secondary receiver of the wake-up radio terminal 110 is used as a backscatter manner, energy consumption of the wake-up radio terminal 110 may be reduced through a non-power operation in which communication is performed by reflecting an external signal.

Figure 3:
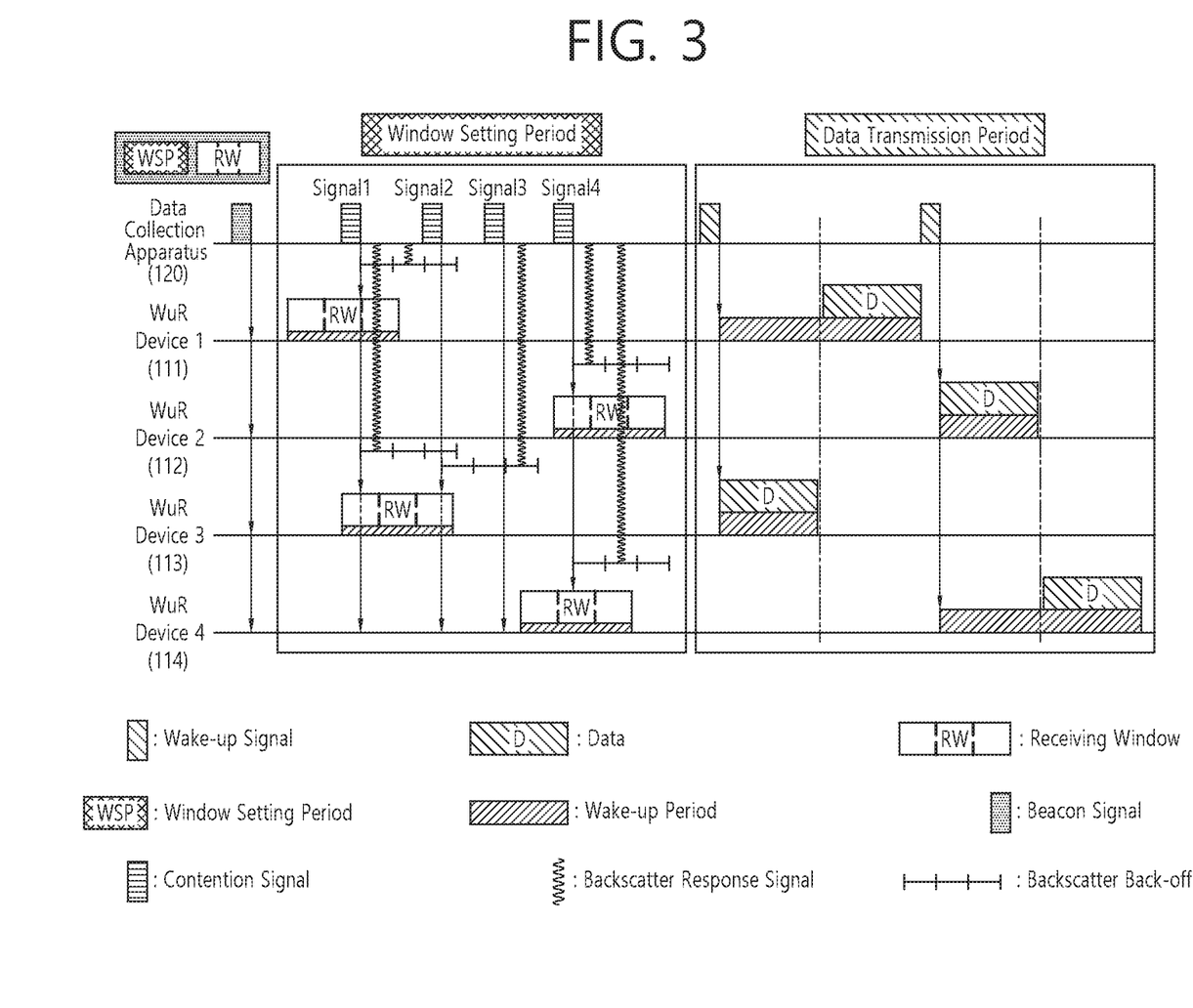
FIG. 3 is a diagram illustrating an operation of a low-power channel contention of a wake-up radio terminal based on a reception time of a contention signal according to an embodiment of the present disclosure.

FIG. 3 is a diagram illustrating an operation of a low-power channel contention of a wake-up radio terminal based on a reception time of a contention signal according to an embodiment of the present disclosure.

An example of the operation of the low-power channel contention of the wake-up radio terminal 110 based on the reception time of the contention signal is illustrated in FIG. 3.

Prior to starting the window setting period, the data collection apparatus 120 transmits a beacon signal including the window setting period and a receiving window (RW) length to all terminals in the network within the window setting period.

When the window setting period starts, the wake-up radio terminal 1 111 and the wake-up radio terminal 3 113 receiving a first contention signal 1 (signal 1) among the four wake-up radio terminals 110 of FIG. 3 receives a contention signal at $2/3$ and $1/3$ time, respectively, according to the receiving window divided into three. The wake-up radio terminal 1 111 and the wake-up radio terminal 3 113 determine the back-off value as 2 and 1, respectively, based on the reception time of the contention signal, and the time corresponding to each back-off value after reception of the contention signal flows and then the first backscatter response message is transmitted.

The second contention signal 2 (signal 2) is received at time 3/3 of the wake-up radio terminal 3 113, and accordingly, the wake-up radio terminal 3 113 transmits a second backscatter response message having a back-off value of 3.

A third contention signal (signal 3) is not received from any terminal.

The wake-up radio terminal 2 112 and the wake-up radio terminal 4 114 receives a fourth contention signal (signal 4) at ⅓ and ⅔ time, respectively, and determines a reception time as a back-off value of 1 and 2 to transmit a backscatter response message.

Here, the backscatter response message that the wake-up radio terminals 110 transmit is successfully received by the data collection apparatus 120 when one wake-up radio terminal 110 transmits the backscatter response message at a specific time. However, a collision occurs when a plurality of wake-up radio terminals 110 having the same back-off value simultaneously transmit a backscatter response message. The data collection apparatus 120 may collect the information of the wake-up radio terminal 110 recognized through the response message that is successfully received for each contention signal. In FIG. 3, for the contention signals 1, 2, and 4 (signals 1, 2, and 4), the data collection apparatus 120 may collect the information of the wake-up radio terminals 1, 2, 3, 4 111, 112, 113, and 114.

Meanwhile, when the window setting period ends, the data transmission period starts. The data collection apparatus 120 performs data transmission scheduling according to the collected terminal information. The data collection apparatus 120 may transmit a wake-up signal for inducing data transmission to the wake-up radio terminals 110 according to the scheduling result, and the wake-up radio terminal 110 receiving the wake-up signal may switch to a wake-up mode and then transmit high-efficiency data to the data collection apparatus 120 without collision. In the data transmission period of FIG. 3, the data collection apparatus 120 holds information of the wake-up radio terminals 1, 2, 3, and 4 111, 112, 113, and 114 in response to the contention signal. The data collection apparatus 120 determines the scheduling order in the collected information order of the terminals 3, 1, 2, and 4 113, 111, 112, and 114, and schedules the data transmission time. According to the scheduling result, the data collection apparatus 120 first transmits a wake-up signal for waking up the terminals 1 and 3 111 and 113, and the wake-up radio terminals 1 and 3 111 and 113 that receives the wake-up signal transmits data according to the included scheduling order information. Thereafter, the data collection apparatus 120 transmits a second wake-up signal for waking up the wake-up radio terminals 2 and 4 112 and 114. Similarly, the data collection apparatus 120 may transmit data without collision by allowing the wake-up radio terminals 2 and 4 112 and 114 receiving the signal to transmit the data in order.

As such, an embodiment of the present disclosure may utilize the backscatter wake-up radio (WuR) technology to enable the wake-up radio terminal 110 to perform the high-efficiency data transmission together with the low-power channel contention. Specifically, according to the embodiment of the present disclosure, the secondary receiver of the wake-up radio terminal 110 may perform the channel contention by allowing the wake-up radio terminal 110 to reflect the contention signal without power using the backscatter manner. An embodiment of the present disclosure may prevent a collision during a subsequent data transmission by performing the data transmission in the order of the wake-up radio terminal 110 that successfully transmits the backscatter response message for the contention signal. According to the embodiment of the present disclosure, the wake-up radio terminal 110 may configure a low-power network that can perform efficient data transmission using minimal energy.

Figure 4:
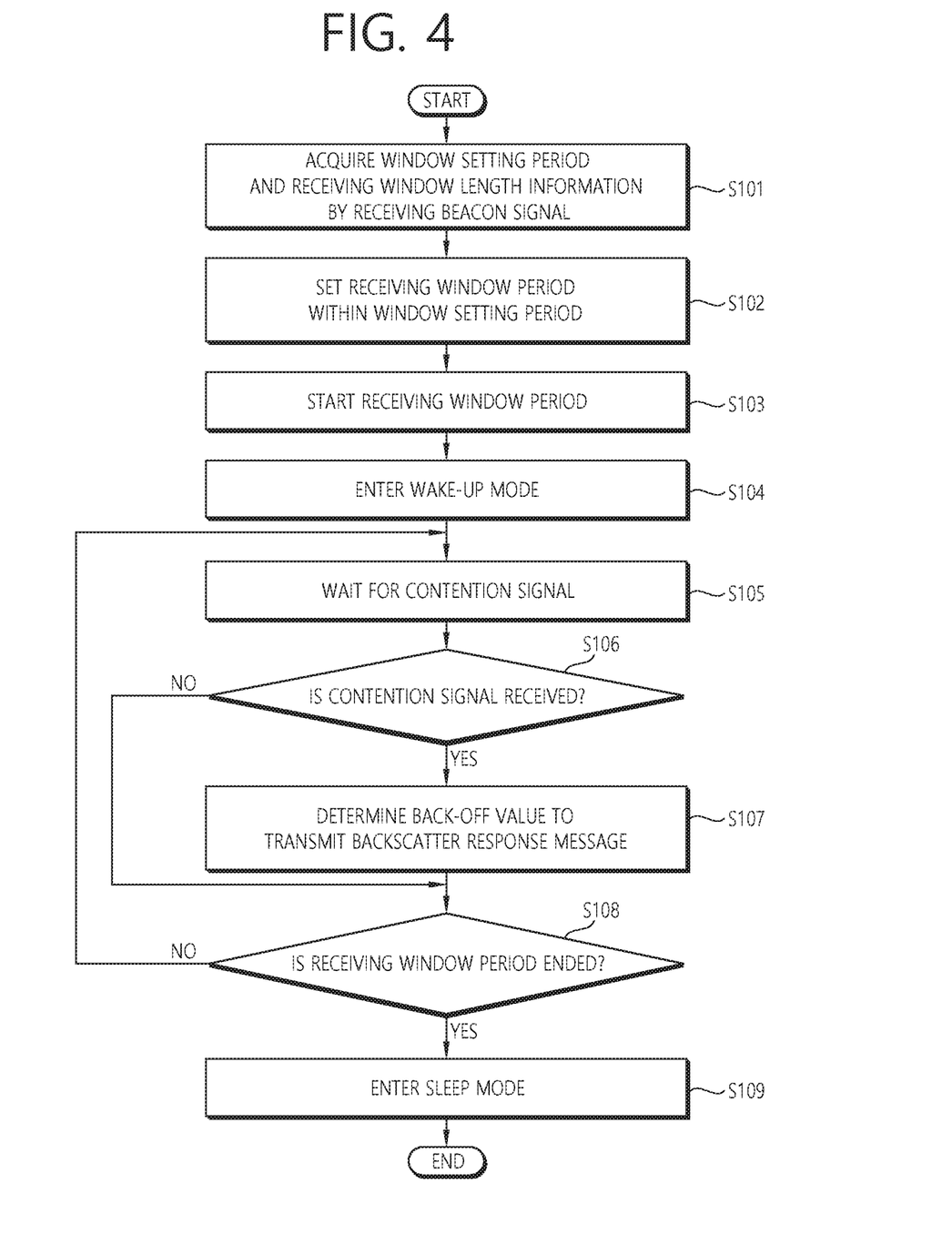
FIGS. 4 and 5 are flowcharts illustrating the operation of the wake-up radio terminal according to the low-power channel contention and the high efficiency data transmission according to the embodiment of the present disclosure.
Figure 5:
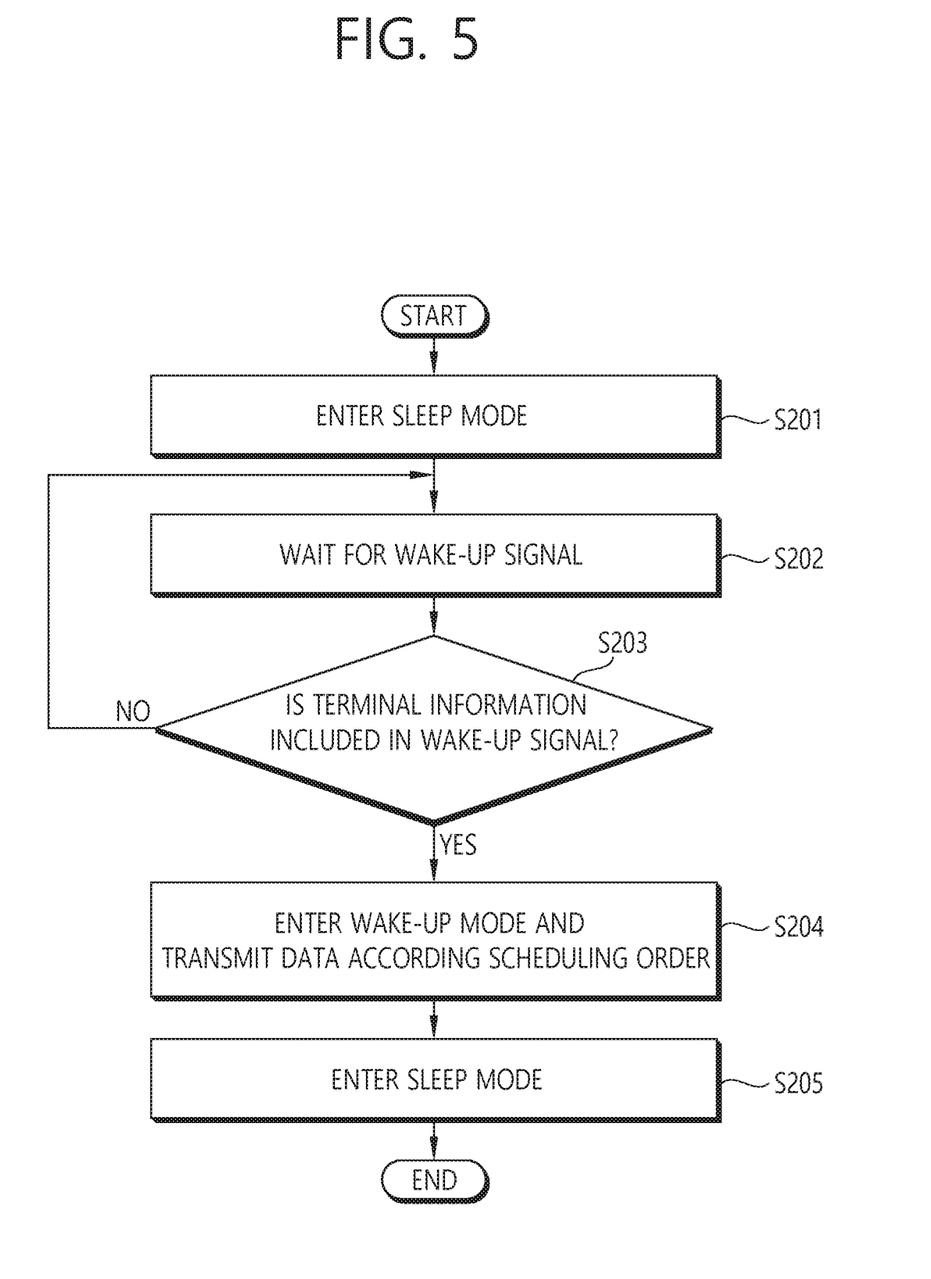

FIGS. 4 and 5 are flowcharts illustrating the operation of the wake-up radio terminal according to the low-power channel contention and the high efficiency data transmission according to the embodiment of the present disclosure.

As illustrated in FIG. 4, in step S101, the wake-up radio terminal 110 receives the beacon signal to obtain the window setting period and the receiving window length information. The wake-up radio terminal 110 receiving the beacon signal may acquire window setting interval and the receiving window length information.

In step S102, the wake-up radio terminal 110 sets a receiving window period within the window setting period. Here, the wake-up radio terminal 110 may arbitrarily set a start point and an end point of the receiving window period receiving a signal from the data collection apparatus 120 within a window setting period.

In step S103, the wake-up radio terminal 110 confirms that the receiving window period has started.

In step S104, the wake-up radio terminal 110 enters the wake-up mode. When the window setting period starts and the set receiving window period starts, the wake-up radio terminal 110 enters the wake-up mode capable of receiving the contention signal.

In step S105, the wake-up radio terminal 110 waits for a contention signal.

In step S106, it is confirmed that the wake-up radio terminal 110 is received a contention signal.

In step S107, when the contention signal is received, the wake-up radio terminal 110 determines a back-off value and transmits a backscatter response message to the data collection apparatus 120. When the wake-up radio terminal 110 does not receive a contention signal, step S108 is performed. As such, if the contention signal is received within the receiving window period, the wake-up radio terminal 110 determines the back-off value and transmits the determined back-off value as the backscatter response message. On the other hand, when the contention signal is not received within the receiving window period, the wake-up radio terminal 110 cannot participate in the channel contention. In the window setting period, the wake-up radio terminal 110 may transmit the backscatter response messages for all contention signals received before the receiving window period ends.

In step S108, the wake-up radio terminal 110 confirms that the receiving window period has ended.

In step S109, when the receiving window period ends, the wake-up radio terminal 110 enters the sleep mode. If the receiving window period has not ended, the wake-up radio terminal 110 performs step S105 of waiting for the contention signal again. When the receiving window period ends, the wake-up radio terminal 110 returns to the sleep mode, and when the window setting period ends, the data transmission period starts.

Meanwhile, as illustrated in FIG. 5, in step S201, the wake-up radio terminal 110 enters the sleep mode.

In step S202, the wake-up radio terminal 110 waits for the wake-up signal.

In step S203, the wake-up radio terminal 110 confirms whether the wake-up signal includes the information of the terminal. The wake-up radio terminal 110 waits for a wake-up signal to be transmitted from the data collection apparatus 120, and the wake-up radio terminal 110 receiving the wake-up signal confirms the information of the terminal included in the wake-up signal.

In step S204, when the wake-up signal includes the information of the terminal, the wake-up radio terminal 110 enters the wake-up mode and performs the data transmission according to the scheduling order. If the information of the terminal is not included in the wake-up signal, step S202 of waiting for the wake-up signal is performed again. As such, the wake-up radio terminal 110 corresponding to the information of the terminal included in the wake-up signal enters the wake-up mode. The wake-up radio terminal 110 transmits data according to the order scheduled by the data collection apparatus 120 and returns to the sleep mode.

In step S205, the wake-up radio terminal 110 enters the sleep mode. The non-appropriate wake-up radio terminal 110 waits for the next wake-up signal again.

As such, according to an embodiment of the present disclosure, the data collection apparatus 120 transmits a beacon signal including a window setting period and a receiving window length to each wake-up radio terminal 110.

Then, the wake-up radio terminals 110 receiving the beacon signal set an arbitrary receiving window period within the window setting period.

Subsequently, the data collection apparatus 120 transmits a contention signal to the wake-up radio terminals 110 in the window setting period Thereafter, the wake-up radio terminals 110 receive a contention signal and select a back-off value to perform channel contention through a backscatter response message.

Then, the data collection apparatus 120 schedules data transmission based on the received backscatter response message of the wake-up radio terminal 110.

Thereafter, in the data transmission period, the data collection apparatus 120 transmits a wake-up signal to the wake-up radio terminals 110.

Then, the wake-up radio terminal 110 receiving the wake-up signal transmits data.

Figure 6:
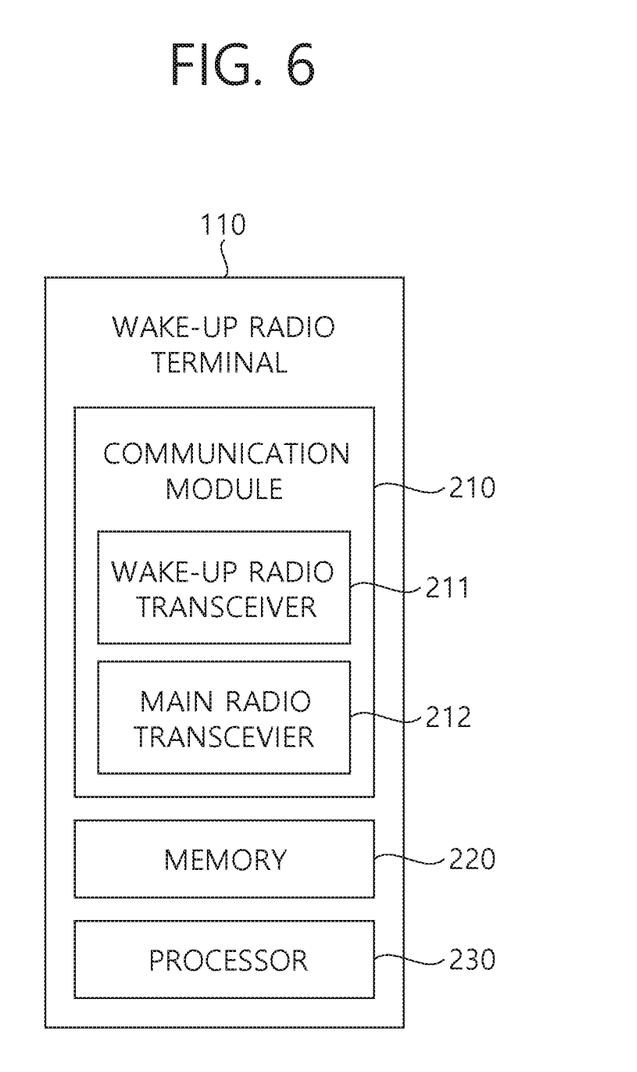
FIG. 6 is a configuration diagram illustrating the configuration of the backscatter wake-up radio terminal according to the embodiment of the present disclosure.

FIG. 6 is a configuration diagram illustrating the configuration of the backscatter wake-up radio terminal according to the embodiment of the present disclosure.

As illustrated in FIG. 6, the backscatter wake-up radio terminal 110 according to the embodiment of the present disclosure includes a communication module 210, a memory 220, and a processor 230. However, all of the illustrated components are not essential components. The backscatter wake-up radio terminal 110 may be implemented by more components than the illustrated components, and the backscatter wake-up radio terminal 110 may be implemented by fewer components.

Hereinafter, the specific configuration and operation of each component of the backscatter wake-up radio terminal 110 of FIG. 6 will be described.

The communication module 210 includes a wake-up radio transmitter and a main radio transmitter 211. The wake-up radio transmitter 211 performs backscatter communication with the data collection apparatus 120 in a sleep mode. The main radio transmitter 212 performs backscatter communication with the data collection apparatus 120 in a wake up mode.

The memory 220 stores one or more programs.

The processor 230 executes one or more programs stored in the memory.

The processor 230 receives a beacon signal from the data collection apparatus 120 through the communication module 210 to set an arbitrary receiving window period in the window setting period, transmits data a backscatter response message to the data collection apparatus 120 based on the reception time of the contention signal received from the collection apparatus 120 in the set receiving window period, receives a wake-up signal from the data collection apparatus 120 in the data transmission period to set as a wake-up period, and transmits data to the data collection apparatus 120 based on a scheduling time point according to a backscatter response message.

According to embodiments, the processor 230 may receive a beacon signal including a window setting period and a receiving window length from the data collection apparatus 120, and may set any of the receiving window length in the window setting period included in the beacon signal.

According to embodiments, when the processor 230 receives a contention signal from the data collection apparatus 120 in the set receiving window period, the processor 230 may determine a back-off value based on the reception time of the received contention signal, and transmit the backscatter response message to the data collection apparatus 120.

According to embodiments, the processor 230 measures the reception time of the contention signal through a clock operation in the receiving window period divided by the same interval or an arbitrary interval, and determines the back-off value corresponding to the measured period and transmit the backscatter response message to the data collection apparatus 120.

According to embodiments, the processor 230 may operate in the sleep mode in the remaining window setting periods other than the set receiving window period in the window setting period.

According to embodiments, the processor 230 may operate in the sleep mode in the remaining data transmission periods other than the set wake-up period in the data transmission period.

According to embodiments, the processor 230 may transmit data to the data collection apparatus 120 based on the terminal information and the scheduling order included in the received wake-up signal.

Figure 7:
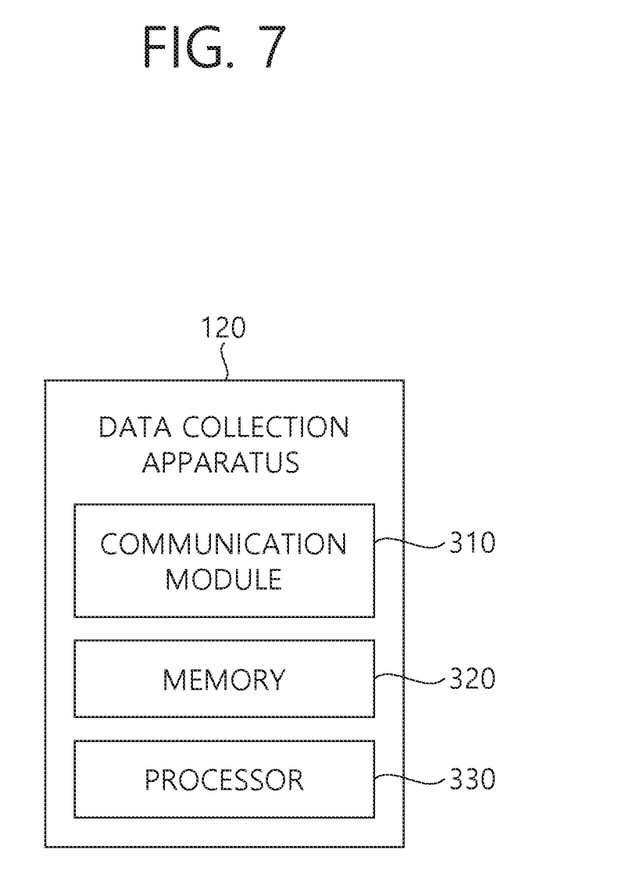
FIG. 7 is a configuration diagram illustrating the configuration of the data collection apparatus according to the embodiment of the present disclosure.

FIG. 7 is a configuration diagram illustrating the configuration of the data collection apparatus according to the embodiment of the present disclosure.

As illustrated in FIG. 7, the data collection apparatus according to the embodiment of the present disclosure includes a communication module 310, a memory 320, and a processor 330. However, all of the illustrated components are not essential components. The data collection apparatus 120 may be implemented by more components than the illustrated components, or the data collection apparatus 120 may be implemented by fewer components.

Hereinafter, the specific configuration and operation of each component of the data collection apparatus 120 of FIG. 7 will be described.

The communication module 310 communicates with the wake-up radio terminal 110 based on the backscatter wake-up radio, and collects data from the wake-up radio terminal 110.

The memory 320 stores one or more programs.

The processor 330 executes one or more programs stored in the memory.

The processor 330 transmits a beacon signal including a window setting period and a receiving window length to the wake-up radio terminal 110 through the communication module 310, transmits the beacon signal to the wake-up radio terminal 110 in the window setting period, schedules data transmission based on the backscatter response message received from the wake-up radio terminal 110, and transmits the wake-up signal to the wake-up radio terminal 110 according to the scheduled data transmission result in the data transmission period.

According to embodiments, the processor 330 may transmit a contention signal to the wake-up radio terminal 110 at an arbitrary time interval in the window setting period.

According to embodiments, the processor 330 may determine the wake-up radio terminal 110 to transmit data in a data transmission period based on a contention result of a transmitted backscatter response message based on a transmission time of the contention signal.

According to embodiments, the processor 330 may transmit the terminal information and the scheduling order of the wake-up radio terminal 110 determined according to the scheduled data transmission result by including the terminal information and the scheduling order in the wake-up signal.

Figure 8:
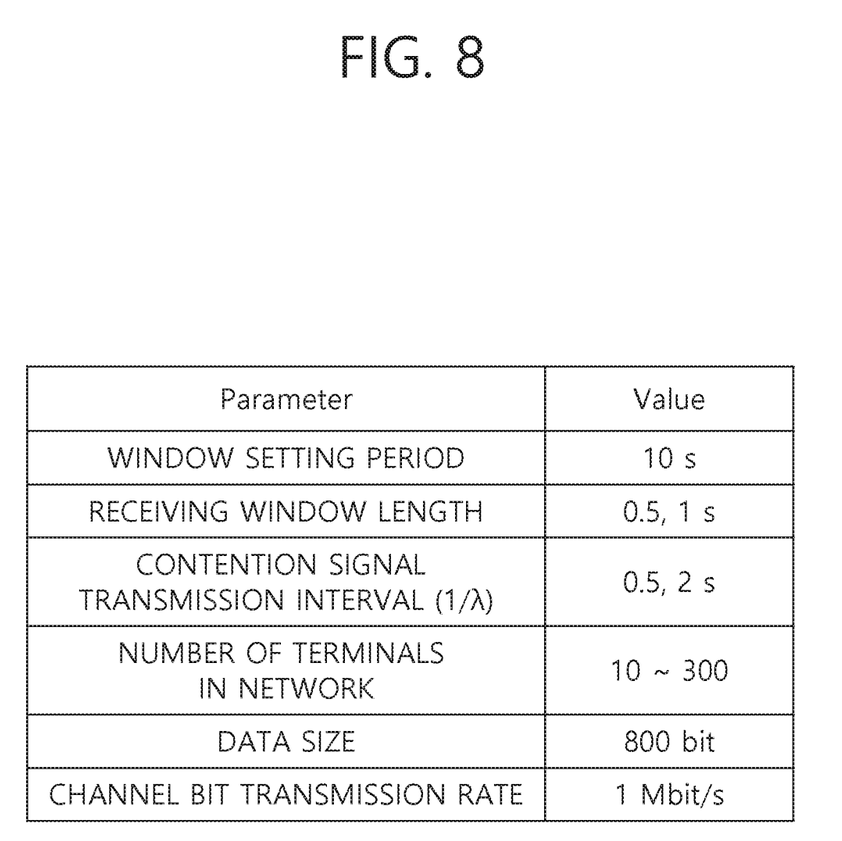
FIG. 8 is a diagram illustrating parameters for simulation an embodiment of the present disclosure.

FIG. 8 is a diagram illustrating parameters for simulation an embodiment of the present disclosure.

A simulation is performed to evaluate the performance of the low power channel contention and high efficiency data transmission method of the backscatter wake-up radio terminal 110 according to an embodiment of the present disclosure. The parameters used in the simulation were set as illustrated in [Table 1] in FIG. 8. The number of wake-up radio terminals 110 in the network is changed from 10 to 300 and measures the network throughput representing a data amount collected over the entire time according to a window length for receiving the contention signal and a transmission period $(1/\lambda)$ of the contention signal of the data collection apparatus 120.

Figure 9:
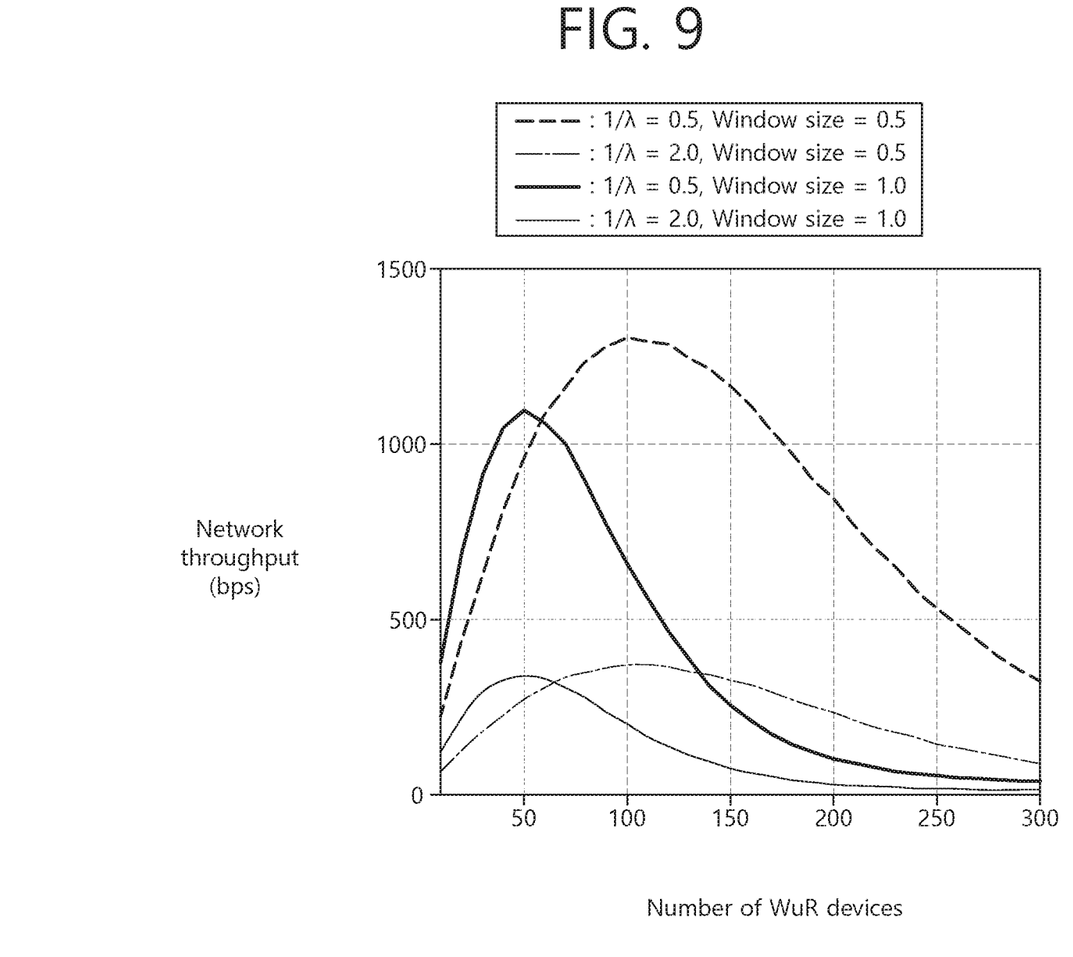
FIG. 9 is a diagram illustrating network throughput according to the number of backscatter wake-up radio terminals for an embodiment of the present disclosure.

FIG. 9 is a diagram illustrating network throughput according to the number of backscatter wake-up radio terminals for an embodiment of the present disclosure.

As the number of wake-up radio terminals 110 increases, the network throughput shows a different increase and decrease rate according to the receiving window length and the contention signal period in a form having a maximum value. When the number of wake-up radio terminals 110 increases, the receiving window overlapping between the wake-up radio terminals 110 increases, and the collision of the backscatter response message frequently occurs. In addition, this leads to a decrease in the network throughput.

In addition, in the same receiving window length environment, as the transmission period $(1/\lambda)$ of the contention signal becomes short, the network throughput steeply increases according to the number of wake-up radio terminals 110, and the improved network throughput is shown. This is because as the number of terminals increases, the receiving window overlapping between terminals increases, the collision of the backscatter response message frequently occurs, and the network throughput decreases. In the network environment in which the same contention signal is transmitted, the longer the receiving window period, the steeper the network throughput increases according to the number of terminals, but when the receiving window period is short, the optimal network throughput is shown. In the long receiving window period, the wake-up radio terminal 110 may increase the probability of receiving the contention signal and may increase the data transmission. However, as the number of wake-up radio terminals 110 increases, the occurrence probability of collision due to the overlapping increases.

Meanwhile, according to an embodiment of the disclosure, the various embodiments described above may be implemented by software including instructions stored in a machine-readable storage medium (for example, a computer-readable storage medium). The machine may be a device that invokes the stored instructions from the storage medium and may be operated depending on the invoked instructions, and may include the electronic device (for example, the electronic device A) according to the disclosed embodiments. In the case in which a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. Here, the term 'non-transitory' means that the storage medium is tangible without including a signal, and does not distinguish whether data are semi-permanently or temporarily stored in the storage medium.

In addition, according to an embodiment of the disclosure, the methods according to various embodiments described above may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least portions of the computer program product may be at least temporarily stored in a storage medium such as a memory of a server of a manufacturer, a server of an application store, or a relay server or be temporarily created.

In addition, according to an embodiment of the disclosure, various embodiments described above may be implemented in a computer or similar device-readable recording medium using software, hardware, or a combination of software and hardware. In some cases, embodiments described in the disclosure may be implemented by the processor itself. According to the software implementation, embodiments such as procedures and functions described in the disclosure may be implemented by separate software modules. Each of the software modules may perform one or more functions and operations described in the disclosure.

Meanwhile, computer instructions for performing processing operations of the machines according to the diverse embodiment of the disclosure described above may be stored in a non-transitory computer-readable medium. The computer instructions stored in the non-transitory computer-readable medium allow a specific machine to perform the processing operations in the machine according to various embodiments described above when they are executed by a processor of the specific machine. The non-transitory computer-readable medium is not a medium that stores data for a while, such as a register, a cache, a memory, or the like, but means a medium that semi-permanently stores data and is readable by the apparatus. A specific example of the non-transitory computer-readable medium may include a compact disk (CD), a digital versatile disk (DVD), a hard disk, a Blu-ray disk, a universal serial bus (USB), a memory card, a read only memory (ROM), or the like.

In addition, each of the components (for example, modules or programs) according to the diverse embodiments may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner. Operations performed by the modules, the programs, or the other components according to the diverse embodiments may be executed in a sequential manner, a parallel manner, an iterative manner, or a heuristic manner, at least some of the operations may be performed in a different order or be omitted, or other operations may be added.

Although the preferred embodiments of the present disclosure have been illustrated and described above, the present disclosure is not limited to the specific embodiments described above, and can be variously modified by those skilled in the art to which the present disclosure pertains without departing from the gist of the present disclosure claimed in the claims, and these modifications should not be understood individually from the technical ideas or prospects of the present disclosure.

What is claimed is:

1. A method for operating a wake-up radio terminal based on a backscatter wake-up radio, comprising:
   receiving a beacon signal from a data collection apparatus, wherein the data collection apparatus includes a signal transmitter;
   setting an arbitrary receiving window period in a window setting period based on the beacon signal;
   transmitting, in the window setting period, a backscatter response message to the data collection apparatus based on a reception time of a contention signal received from the data collection apparatus in the set receiving window period; and
   receiving a wake-up signal from the data collection apparatus in a data transmission period; and
   in response to receiving the wake-up signal:
      setting a wake-up period within the data transmission period,
      switching to a wake-up mode, and
      transmitting data to the data collection apparatus based on a scheduling time according to a backscatter response message.

2. The method of claim 1,
   wherein in the setting of the receiving window period, the beacon signal including
      the window setting period and
      a receiving window length,
   is received from the signal transmitter, and
   an arbitrary receiving window period having the receiving window length is set in the window setting period included in the beacon signal.

3. The method of claim 1,
   wherein in the transmitting of the backscatter response message, when the contention signal is received from the data collection apparatus in the set receiving window period, a back-off value is determined based on the reception time of the contention signal to transmit the backscatter response message to the data collection apparatus.

4. The method of claim 1,
   wherein in the transmitting of the backscatter response message, the reception time of the contention signal is measured through a clock operation in the receiving window period divided by an equal interval or random interval, and
   the back-off value corresponding to the measured period is determined to transmit the backscatter response message to the data collection apparatus.

5. The method of claim 1, further comprising:
   operating in a sleep mode in remaining window setting periods other than the set receiving window period in the window setting period.

6. The method of claim 1, further comprising:
   operating in a sleep mode in remaining data transmission periods other than the set wake-up period in the data transmission period.

7. The method of claim 1,
   wherein in the transmitting of the data, data is transmitted to the data collection apparatus based on
      terminal information and
      a scheduling order included in the received wake-up signal.

8. A wake-up radio terminal based on a backscatter wake-up radio, comprising:
   a communication module that includes
      a wake-up radio transmitter performing backscatter communication in a sleep mode and
      a main radio transmitter performing data transmission in a wake-up mode;
   one or more processors configured to executed instructions; and a memory storing instructions, which when executed by the one or more processors configure the one or more processors to:
      receive a beacon signal from a data collection apparatus, wherein the data collection apparatus includes a signal transmitter,
      set an arbitrary receiving window period in a window setting period based on the received beacon signal,
      transmit, in the window setting period, a backscatter response message to the data collection apparatus based on a reception time of a contention signal received from the data collection apparatus in the set receiving window period and
      receive, from the data collection apparatus, a wake-up signal in a data transmission period, and
   in response to receiving the wake-up signal:
      set a wake-up period within the data transmission period,
      switch to a wake-up mode and,
      transmit data to the data collection apparatus based on a scheduling time according to the backscatter response message.

9. The wake-up radio terminal of claim 8,
   wherein the one or more processors are configured to receive the beacon signal including
      the window setting period and
      a receiving window length, from the signal transmitter, and
   set an arbitrary receiving window period having the receiving window length in the window setting period included in the beacon signal.

10. The wake-up radio terminal of claim 8,
wherein the one or more processors are configured to
determine a back-off value based on the reception time of the received contention signal to transmit the backscatter response message to the data collection apparatus when the contention signal is received from the data collection apparatus in the set receiving window period.

11. The wake-up radio terminal of claim 8,
wherein the one or more processors are configured to
measure the reception time of the contention signal through a clock operation in the receiving window period divided by an equal interval or random interval, and
determine the back-off value corresponding to the measured period to transmit the backscatter response message to the data collection apparatus.

12. The wake-up radio terminal of claim 8,
wherein the one or more processors are configured to
transmit data to the data collection apparatus based on terminal information and
a scheduling order included in the received wake-up signal.

\* \* \* \* \*